United States Patent Office 2,707,154
Patented Apr. 26, 1955

2,707,154

ANTIOXIDANTS AND COMPOSITIONS CONTAINING SAME

Barbara T. Lehmann, Dayton, Ohio, and Betty M. Watts, Tallahassee, Fla., assignors to Monsanto Chemical Company, St. Louis, Mo., a corporation of Delaware No Drawing. Application June 9, 1952,
Serial No. 292,585

12 Claims. (Cl. 99—163)

The present invention relates to aqueous fat systems, particularly complex foods containing both an aqueous and a fatty phase, and to a method of stabilizing such products against oxidative deterioration. It relates also to the products so stabilized.

Animal, vegetable, fish and like oils and fats are fatty acid glycerides, and aqueous systems containing such materials as well as complex foods and pharmaceutical preparations presenting both an aqueous and a fatty phase are subject to oxidative deterioration which is accelerated by heat, light, various metals such as copper and iron, and other chemicals. This oxidative deterioration results in the formation of peroxides which eventually break down to aldehydes, ketones, peroxides and other oxidative degradation products. The undesirable effect of such oxidative deterioration is manifested by a disagreeable odor and taste imparted to the above glycerides and products containing same. This condition is generally referred to as rancidity, but as hereinafter pointed out, it may also and usually does involve other oxidative changes which precede rancidity.

For example, meats lose their pink color at an early stage of oxidation, usually before the fat becomes rancid. Moreover, frozen baked products develop off-odors and flavors before the fat gives a chemical test for rancidity. Furthermore, there is ample evidence of the partial or complete destruction of carotene, vitamins A, C and D, biotin and other nutrients early in the oxidative process. However, as these undesirable changes in appearance, palatability and nutritive value of the above products are associated with a very early stage of fat peroxidation, antioxidants which protect the fat usually retard the whole train of oxidative changes.

It is an object of the invention to substantially retard or inhibit oxidative deterioration of aqueous fat systems, complex foods and pharmaceutical products containing both an aqueous and a fatty phase.

Another object is to substantially retard or inhibit oxidative deterioration of aqueous fat systems, complex foods and pharmaceutical products in the presence or absence of metals such as copper, iron or their compounds which normally tend to accelerate oxidation and deterioration of the above materials.

Another object of the instant invention is to substantially retard or inhibit the development of rancidity and the associated oxidative changes which occur in aqueous fat systems, pharmaceutical preparations and complex food products.

Another object is to provide novel antioxidants which substantially retard or inhibit oxidative deterioration of aqueous systems including animal, vegetable, fish and/or like oils and fats as well as complex food products and pharmaceutical preparations containing such aqueous systems.

A further object is to provide as novel products aqueous fatty glyceride compositions, particularly complex foods and pharmaceutical products presenting both an aqueous and a fatty phase, stabilized against oxidative deterioration by the novel antioxidants of the instant invention.

A still further object is to provide a novel method of stabilizing aqueous fat systems, complex foods and pharmaceutical products of the above type against oxidative deterioration.

Other objects and advantages will be apparent to those skilled in the art as the description of the invention proceeds.

We have made the surprising discovery that combinations of a phenolic antioxidant with a normal molecularly dehydrated alkali metal phosphate and ascorbic acid and/or sodium ascorbate are highly effective antioxidants for aqueous fatty glyceride systems and also complex food products and pharmaceutical preparations containing both an aqueous phase and a fatty phase.

The phosphates employed in accordance with the instant invention have the general formula $M_2O.P_2O_5$, in which M is an alkali metal, particularly potassium and sodium, and in which the molar ratio of $M_2O$ to $P_2O_5$ is in the range of 1:1 to 1.9:1, and preferably in the range of 1:1 to 1.7:1. As illustrative of the preferred compounds within the above range of alkali metal phosphates, there may be mentioned potassium metaphosphate, sodium hexametaphosphate known as Graham's salt, sodium trimetaphosphate, Maddrell's salt, pentasodium triphosphate and nonasodium heptaphosphate; the invention, however, is not limited to these materials as other normal molecularly dehydrated alkali metal phosphates and mixtures thereof having a molar ratio in the above range may be employed.

The normal molecularly dehydrated alkali phosphates referred to above are prepared by heating orthophosphoric acid compounds of sodium, potassium, etc. or suitable mixtures thereof to a temperature sufficient to effect molecular dehydration. Depending upon the alkali oxide/$P_2O_5$ molar ratio and the heating and cooling conditions employed, the products thus obtained may be definite crystalline compounds, glasses or mixtures thereof. Thus, sodium hexametaphosphate is a glassy material; the other metaphosphates of sodium, namely, sodium trimetaphosphate and Maddrell's salt, are respectively water soluble and water insoluble crystalline materials; and the remaining sodium phosphates within the above range are crystalline or glassy materials or mixtures thereof depending upon the above-mentioned conditions. Further description of the molecularly dehydrated sodium phosphates or the other molecularly dehydrated alkali phosphates is deemed unnecessary since their properties and method of manufacture are well known.

The phenolic antioxidants employed may be varied widely. Illustrative examples of these are tocopherols, nordihydroguaiaretic acid, ethyl pyrogallol, gallic acid and its esters such as methyl, ethyl, propyl, butyl, hexyl and lauryl gallates and tertiary butyl phenols such as 3-tertiarybutyl-4-hydroxyanisole, 2-tertiary-butyl-4-hydroxyanisole, 4-chloro 2,6-ditertiary butylphenol, 2,6-ditertiary butyl p-methoxy phenol, 2,4,6-tritertiary butylphenol, 2,6-ditertiary amyl-p-cresol, 2,6-ditertiary butyl-p-cresol, etc. Of these antioxidants, nordihydroguaiaretic acid, the tocopherols and the tertiary butyl hydroxy anisoles are preferred.

For a more complete understanding of the present invention, reference is made to the hereinafter described method of evaluating the antioxidants and also the subsequent experimental data.

The phenolic antioxidants tested, namely, alpha-tocopherol, nordihydroguaiaretic acid and butylated hydroxyanisole were dissolved directly in fresh lard in concentrations of 0.05%, the lard selected being one showing no initial peroxide number. With the exception of nordihydroguaiaretic acid, all of the above antioxidants were soluble in cold lard in the above concentration, but since nordihydroguaiaretic acid required heating to 150° C. for solution, they were all treated in the latter manner. The concentrated solutions thus obtained were then diluted with plain lard to the final concentration of 0.005% antioxidant used in the experiments.

The aqueous phase used as a blank was a 0.01 molar solution of sodium borate having a pH of 7.5. This buffer solution was employed since it had been previously shown to have no effect on rancidity.

The auxiliary antioxidants, i. e., the ascorbic acid and molecularly dehydrated sodium phosphates were adjusted to a pH of 7.5 with NaOH or HCl and then each was added to the above aqueous phase in a final concentration of 0.1% by weight. At the above pH, the ascorbic acid was present practically entirely as the sodium salt.

The method of obtaining contact between the aqueous phase and the lard is described in Food Techn. 3, pages 152-155 (1949), which method consisted essentially of the following operations.

The aqueous phase in which the water soluble antioxidants were dissolved was absorbed on a filter paper having a diameter of 7½ centimeters and the melted lard containing any fat soluble antioxidant and 0.01% carotene was absorbed on another filter paper having a diameter of 7 centimeters. The paper containing the aqueous phase was placed in a Petri dish with the lard impregnated paper on top of it. The fat penetrated rapidly throughout both papers, giving an even yellow color. Several drops of a preservative, ethylene dichloride, were added. The Petri dish was then sealed with paraffin and stored in an air oven at 45° C. and the course of the oxidation was followed by visual inspection of the yellow color. The sample was considered rancid when the papers were half bleached.

Following the above procedure, experiments were carried out to illustrate the protective action on aqueous lard systems of mixtures of normal molecularly dehydrated sodium phosphates and phenolic antioxidants in the presence or absence of sodium ascorbate. The results of these experiments are given in the following table.

| Antioxidant,[1] 0.1 percent | Substrate | Days to Turn Rancid |
|---|---|---|
| Buffer | Lard and 0.005% Butylated Hydroxy Anisole. | 27 |
| Sodium Ascorbate | ----do---- | 7 |
| Pentasodium Triphosphate. | ----do---- | 38 |
| Pentasodium Triphosphate and Sodium Ascorbate. | ----do---- | 68 |
| Buffer | ----do---- | 22 |
| Sodium Ascorbate | ----do---- | 7 |
| Sodium Hexametaphosphate. | ----do---- | 49 |
| Sodium Hexametaphosphate and Sodium Ascorbate. | ----do---- | 98 |
| Buffer | Lard and 0.005% alpha-Tocopherol. | 16 |
| Sodium Ascorbate | ----do---- | 20 |
| Sodium Hexametaphosphate. | ----do---- | 43 |
| Sodium Hexametaphosphate and Sodium Ascorbate. | ----do---- | 65–89 |
| Buffer | Lard and 0.005% Nordihydro-guaiaretic Acid. | 15 |
| Sodium Ascorbate | ----do---- | 91 |
| Sodium Hexametaphosphate. | ----do---- | 65–89 |
| Sodium Hexametaphosphate and Sodium Ascorbate. | ----do---- | 138 |

[1] Each antioxidant was employed in a concentration of 0.1% so that, when two were combined, the total concentration was 0.2%.

The results of the above experiments demonstrate that a combination of a phenolic antioxidant with a normal molecularly dehydrated sodium phosphate and sodium ascorbate retards the development of rancidity in lard to a far greater extent than when the phenolic inhibitor per se or combinations thereof with the above phosphates are used without sodium ascorbate. In addition, they show that of the above combinations, the mixture consisting of sodium hexametaphosphate, nordihydroguaiaretic acid and sodium ascorbate displays exceptional antioxidant properties since it retarded the development of rancidity in the lard for a period of 138 days.

The foregoing description has been concerned primarily with demonstrating the protective action of the antioxidants of the present invention in aqueous systems including lard. However, the invention is not limited thereto as it is also applicable to aqueous systems including unsaturated fatty acids and/or animal, vegetable, fish and like oils and fats which are normally subject to oxidative deterioration.

For example, the antioxidants of the present invention may be advantageously used to inhibit or substantially retard oxidative deterioration of aqueous compositions including oleic acid, linoleic acid, linolenic and arachidonic and similar unsaturated fatty acids; aqueous compositions containing cottonseed oil, corn oil, peanut oil, sesame oil, soya bean oil, olive oil, cocoanut oil, palm kernel oil, natural butter, cocoa butter, shortening, tallow, oleo oil, cod liver oil, halibut liver oil, mackerel oil, herring oil, whale oil, edible oils, hydrogenated animal oils, hydrogenated vegetable oils, and hydrogenated fish oils; and complex food products containing both an aqueous phase and a fatty phase, such as baked products, cooked or frozen meat products, fish, salad dressings, margarine, emulsified food products, animal and poultry feed and numerous other food products.

In carrying out the instant invention, the normal molecularly dehydrated alkali metal phosphate, the ascorbic acid and alkali metal salts thereof and the phenolic antioxidants may be incorporated and uniformly distributed in the above products in any suitable manner. For example, the antioxidants of the instant invention may be separately added or premixed to form a composite antioxidant and then added to the material to be treated.

Moreover, the composite antioxidant may be added to dry curing compositions and applied by rubbing to the surface of hams, bacons and other meats; it may be premixed with seasoning or spices and then incorporated in prepared (cooked) meat products, fish, frozen meat products, etc.; it may be mixed with leavening agents, baking powders or flours and the resulting product mixed with water and/or flour to produce bread, cake, pie crust and doughnut doughs.

Furthermore, the composite antioxidant composition may be dissolved in curing fluids and the latter introduced into or applied to the surface of hams, bacons and other meats in the customary manner; it may also be dissolved or dispersed in water or other media and blended or emulsified with the ingredients required to produce salad dressings and other emulsified foods; and it may be applied to solid whole chunks of meat to be canned by using a solution of the above composite antioxidant as a cooking medium.

In general, the quantity of composite antioxidant required to inhibit or substantially retard oxidative deterioration of the above-mentioned products depends upon the particular material selected for protection, the presence or absence of auxiliary antioxidants or prooxidant metals; the type of container used to ship or store the above products and finally the stability requirements of the selected materials. For most purposes, about 0.1% to about 0.2% by weight of the composite antioxidant is sufficient, but it is within the scope of the invention to employ this material in an amount varying within the range of about 0.007% to about 2.05% by weight.

With respect to the components of the composite antioxidant, they are desirably varied within the following limits.

| | Percent by weight of fat or aqueous fat system |
|---|---|
| A phenolic antioxidant | About 0.001 to about 0.05. |
| A compound selected from the group consisting of ascorbic acid, alkali metal salts of ascorbic acid and mixtures thereof | About 0.001 to about 1.0. |
| A normal molecularly dehydrated alkali metal phosphate having the formula $M_2O \cdot P_2O_5$ in which M is an alkali metal selected from the group consisting of sodium and potassium and the molar ratio of $M_2O$ to $P_2O_5$ is in the range of 1:1 to 1.9:1 | About 0.005 to about 1.0. |

Within the above limits, the preferred concentrations are approximately 0.1% each of the molecularly dehydrated alkali metal phosphate and the ascorbic acid and/or the alkali metal salts thereof and about 0.005% of the phenolic antioxidant.

Although the above concentrations of antioxidant are given in terms of the composite antioxidant composition, it is to be understood that the same concentrations are applicable when the components thereof are separately added to aqueous fat systems to stabilize same against substantial oxidative deterioration.

The above composite antioxidant constitutes a new composition of matter containing the components thereof in the following percentages by weight.

| Component | Percent by weight |
|---|---|
| A phenolic antioxidant | About 1 to about 10. |
| A compound selected from the group consisting of ascorbic acid, alkali metal salts of ascorbic acid and mixtures thereof | About 10 to about 80 |
| A normal molecularly dehydrated alkali metal phosphate having the formula $M_2O \cdot P_2O_5$ in which M is an alkali metal selected from the group consisting of sodium and potassium and the molar ratio of $M_2O$ to $P_2O_5$ is in the range of 1:1 to 1.9:1. | About 10 to about 80 |

Within the above limits, the preferred composite antioxidant has the following composition.

| Component | Percent by weight |
|---|---|
| A phenolic antioxidant | 6 |
| A compound selected from the group consisting of ascorbic acid, alkali metal salts of ascorbic acid and mixtures thereof | 47 |
| A normal molecularly dehydrated alkali metal phosphate having the formula $M_2O \cdot P_2O_5$ in which M is an alkali metal selected from the group consisting of sodium and potassium and the molar ratio of $M_2O$ to $P_2O_5$ is in the range of 1:1 to 1.91 | 47 |

As many widely different embodiments of this invention may be made without departing from the spirit and scope thereof, it is to be understood that we do not limit ourselves to the specific embodiments thereof except as defined in the appended claims.

What we claim is:

1. A composition of matter comprising the following components in substantially the indicated proportions to make up 100% by weight.

| Component | Percent |
|---|---|
| A phenolic antioxidant | About 1 to about 10. |
| A compound selected from the group consisting of ascorbic acid, alkali metal salts of ascorbic acid and mixtures thereof | About 10 to about 80. |
| A normal molecularly dehydrated alkali metal phosphate having the formula $M_2O \cdot P_2O_5$ in which M is an alkali metal selected from the group consisting of sodium and potassium and the molar ratio of $M_2O$ to $P_2O_5$ is in the range of 1:1 to 1.9:1. | About 10 to about 80. |

2. A composition of matter comprising the following components in substantially the indicated proportions by weight.

| Component | Percent |
|---|---|
| A phenolic antioxidant | 6 |
| A compound selected from the group consisting of ascorbic acid, alkali metal salts of ascorbic acid and mixtures thereof | 47 |
| A normal molecularly dehydrated alkali metal phosphate having the formula $M_2O \cdot P_2O_5$ in which M is an alkali metal selected from the group consisting of sodium and potassium and the molar ratio of $M_2O$ to $P_2O_5$ is in the range of 1:1 to 1.9:1 | 47 |

3. A composition of matter comprising an aqueous phase and a fatty phase and a sufficient amount of an antioxidant to substantially retard oxidative deterioration of said fatty phase, said antioxidant comprising a phenolic antioxidant; a compound selected from the group consisting of ascorbic acid, alkali metal salts of ascorbic acid and mixtures thereof; and a normal molecularly dehydrated alkali metal phosphate having the formula $M_2O \cdot P_2O_5$ in which M is an alkali metal selected from the group consisting of sodium and potassium and the molar ratio of $M_2O$ to $P_2O_5$ is in the range of about 1:1 to about 1.9:1.

4. A composition of matter comprising an aqueous phase and a fatty phase and about 0.007% to about 2.05% by weight of a composite antioxidant comprising a mixture of a phenolic antioxidant; a compound selected from the group consisting of ascorbic acid, alkali metal salts of ascorbic acid and mixtures thereof; and a normal molecularly dehydrated alkali metal phosphate having the formula $M_2O \cdot P_2O_5$ in which M is an alkali metal selected from the group consisting of sodium and potassium and the molar ratio of $M_2O$ to $P_2O_5$ is in the range of about 1:1 to about 1.9:1.

5. A composition of matter in accordance with claim 4 in which pentasodium triphosphate is the normal molecularly dehydrated alkali metal phosphate employed.

6. A composition of matter in accordance with claim 4 in which sodium hexametaphosphate is the normal molecularly dehydrated alkali metal phosphate employed.

7. A composition of matter in accordance with claim 4 in which Maddrell's salt is the normal molecularly dehydrated alkali metal phosphate employed.

8. A composition of matter comprising an aqueous phase and a fatty phase and as an antioxidant therefor 0.005% by weight of butylated hydroxy anisole and a mixture of about 0.1% by weight of pentasodium triphosphate and about 0.1% by weight of sodium ascorbate.

9. A composition of matter comprising an aqueous phase and a fatty phase and as an antioxidant therefor 0.005% by weight of butylated hydroxy anisole and a mixture of about 0.1% by weight of sodium hexametaphosphate and about 0.1% by weight of sodium ascorbate.

10. A composition of matter comprising an aqueous phase and a fatty phase and as an antioxidant therefor about 0.005% by weight of alpha-tocopherol and a mixture of about 0.1% by weight of sodium ascorbate and about 0.1% by weight of sodium hexametaphosphate.

11. A composition of matter comprising an aqueous phase and a fatty phase and as an antioxidant therefor about 0.005% by weight of nordihydroguairaretic acid and a mixture of about 0.1% by weight of sodium ascorbate and about 0.1% by weight of sodium hexametaphosphate.

12. A composition of matter comprising an aqueous phase and a fatty phase and about 0.007% to about 2.05% by weight of a composite antioxidant comprising a mixture of about 6% by weight of a phenolic antioxidant; about 47% by weight of a compound selected from the group consisting of ascorbic acid, alkali metal salts of ascorbic acid and mixtures thereof; and about 47% by weight of a normal molecularly dehydrated alkali metal phosphate having the formula $M_2O \cdot P_2O_5$ in which M is an alkali metal selected from the group consisting of sodium and potassium and the molar ratio of $M_2O$ to $P_2O_5$ is in the range of about 1:1 to about 1.9:1.

References Cited in the file of this patent

UNITED STATES PATENTS

| | | |
|---|---|---|
| 2,511,803 | Hall | June 13, 1950 |
| 2,513,094 | Hall | June 27, 1950 |

OTHER REFERENCES

Chang: Food Technology, October 1949, pages 332 to 336.